June 9, 1925.  
D. F. FESLER  
COUPLING MEMBER  
Filed Feb. 14, 1921
1,541,338
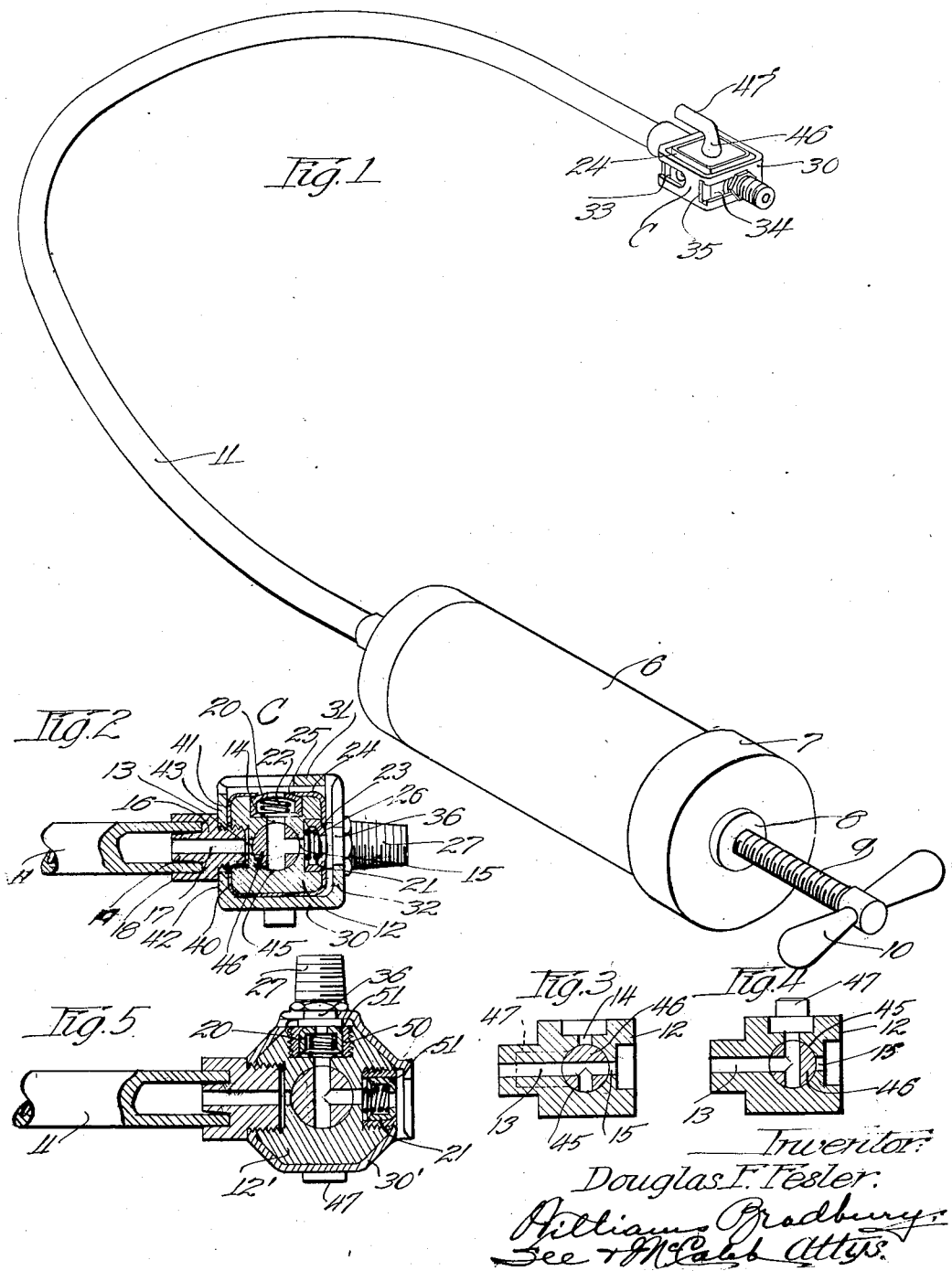

Patented June 9, 1925.

1,541,338

UNITED STATES PATENT OFFICE.

DOUGLAS F. FESLER, OF EVANSTON, ILLINOIS, ASSIGNOR TO THE BASSICK MANUFACTURING CO., OF CHICAGO, ILLINOIS, A CORPORATION OF DELAWARE.

COUPLING MEMBER.

Application filed February 14, 1921. Serial No. 444,960.

*To all whom it may concern:*

Be it known that I, DOUGLAS F. FESLER, a citizen of the United States, residing at Evanston, in the county of Cook and State of Illinois, have invented certain new and useful Improvements in Coupling Members, of which the following is a full, clear, concise, and exact description, reference being had to the accompanying drawings, forming a part of this specification.

My invention relates to improvements in coupling members and is particularly concerned with improvements in that type of coupling member forming a part of a lubricating system comprising a plurality of nipples adapted to be secured to the various bearings to be lubricated and a compressor for supplying lubricant to said nipples, comprising a discharge conduit provided at its free ends with a coupling adapted to be attached to and detached from the nipples.

The objects of my invention are:—

First; to provide a coupling of the character described which comprises a plurality of discharge bores or openings, and means for connecting any one of said bores with a lubricant receiving nipple, the said connecting means preferably being located at different angles to each other so as to make it possible to approach nipples located at various angles and in different parts of a mechanism without requiring excessive flexing or bending of the flexible discharge conduit of the compressor.

Second; to provide a coupling of the character described which comprises means for releasing the pressure of the lubricant upon the nipple without necessarily releasing the pressure upon the lubricant in the compressor so as to make it possible to disconnect the coupling from the nipple without reducing the pressure in the compressor, and Third; to provide a coupling of the character described which is simple in construction and economical to manufacture.

Other objects of my invention will definitely appear as this description progresses, reference being had to the accompanying drawings, in which Figure 1 is a perspective view of a lubricant compressor, the discharge conduit of which is provided with my improved coupling.

Figure 2 is a central longitudinal section through my improved coupling showing the valve in one position.

Figures 3 and 4 are sectional details showing the valve in two different positions, and Figure 5 is a central longitudinal section through a modified embodiment of my invention.

Throughout the several figures, similar reference characters will be used for referring to similar parts.

The compressor of which I have illustrated my improved coupling member as forming a part comprises a barrel 6 having a detachable cap 7 which can be removed for the purpose of filling the barrel. A threaded nut 8 extends through the cap and coacts with a threaded rod 9 the inner end of which is provided with a suitable plunger, not shown, and the outer end of which is provided with a handle 10 by means of which the rod 9 can be rotated to move the plunger longitudinally of the barrel 6. A flexible discharge conduit 11 is connected with the end of the barrel opposite the cap 7 and is preferably formed of flexible metallic hose or tubing capable of withstanding comparatively high pressures.

My improved coupling which I have designated in Figure 1 by the reference character C comprises (see Figure 2) a body member 12 which is illustrated as being substantially rectangular in cross-section. This body member is provided with a plurality of bores 13, 14 and 15 which meet in the body member at a common point. A union 16 is threaded into the body member 12 and provided with a bore 17 which communicates with the bore 13. The outer end of the union 16 comprises an annular flange 18 and a concentric nipple 19 to which the free end of the discharge conduit 11 is soldered or otherwise secured.

The bores 14 and 15 open through two different faces of the body member 12 which are disposed at angles to each other and are enlarged at their outer ends for receiving the cup-leathers 20 and 21, respectively.

These cup-leathers are yieldingly urged outwardly by means of compression springs 22 and 23, respectively which are interposed between the cup-leathers and the bottoms of the enlarged portions of the bores 14 and 15, respectively.

For preventing the cup-leathers or gaskets from being completely displaced from their respective bores, I provide a retaining member in the form of a thin sheet metal strap 24 which is bent around the four faces of the body member and is provided with openings 25 and 26 registering with the enlarged portions of the bores 14 and 15, respectively, but being of slightly less diameter than the enlarged portion of the bores 14 and 15, so as to provide overhanging flanges which act as abutments for the gaskets of the respective bores and thus prevent these gaskets from being completely displaced from the body member under the tension of the compression springs.

For providing means for detachably connecting the body member to the headed nipples 27, a detailed description of the construction of which may be found in my co-pending application, Case 23, filed of even date herewith, I provide a second metal strap 30 which is considerably thicker than the metal strap 24 and which is similarly bent around the four sides of the body member 12, two of its sides 31 and 32 being held in parallel spaced relation to the adjacent sides of the body member 12. Two slots 33 and 34 are cut in the strap 30. These slots extend to the adjacent side which is cut away as shown at 35 in Figure 1, to provide flanges adapted to be received by the annular groove 36 which forms the head of the nipple 27. These slots provide means for connecting the coupling member to a nipple at two different angles so as to make it possible to make this connection without unduly flexing the cable, and makes it possible for the operator to approach the nipple and make the connection by movements in different directions, and thus enables him to reach nipples which might otherwise be inaccessible.

The opposed ends 40 and 41 of the strap 24, and 42 and 43, of the strap 32, are clamped to one face of the body member 12 by the over-hanging portion of the union 16 as shown in Figure 2.

The bores 13, 14 and 15 are intersected by a third bore 45 which extends at right angles to the bores 13, 14 and 15 and in which is rotatably mounted a three way valve 46 which is provided with a handle 47 by means of which it can be rotated. In Figure 3, I have illustrated the position of this valve for making connection between the bore 13 and the bore 15 and thus supply lubricant to a nipple connected as shown in Figure 2. When the valve is then turned to the position shown in Figure 2, the supply of lubricant to the nipple is shut off and the bore 13 is connected with the bore 14, thereby permitting the lubricant in the bore 13 and the passageway of the valve to expand so as to relieve the pressure on the head of the nipple 27 and thus permit it to be disconnected from the coupling member. It will, of course, be understood that in the absence of air mixed with the lubricant, the lubricant is practically non-compressible and the expansion referred to will be very slight. Nevertheless, it is necessary to permit the detachment of the coupling member from the nipple 27.

When the valve 46 is turned to the position shown in Figure 4, the lubricant will then be supplied to a nipple communicating with the bore 14. To relieve the pressure on the nipple, it is then necessary to return the valve to the position shown in Figure 2, when the lubricant in the bore 14 and the passageway of the valve will be permitted to expand into the bore 15, as described above.

In Figure 5, I have illustrated a modified form of my invention wherein the strap 24 shown in Figure 2 is dispensed with and the gaskets 20 and 21 are retained in the body member by means of the retaining rings 50 which are threaded into the body member and the outer ends of which are flanged inwardly, as shown at 51, to form abutments for the gaskets. In this figure, the body member 12' and the metal strap 30' are formed somewhat differently than the corresponding elements shown in Figure 2, but their mode of operation is the same as in Figure 2 and will be clearly understood merely from an inspection of Figure 5.

While I have described the details of construction of the preferred embodiment of my invention, it must be clearly understood that my invention is not limited to these details but is capable of other adaptations and modifications within the scope of the appended claims.

Having thus described my invention, what I claim is:—

1. A coupling comprising a body member having a plurality of bores formed therein, the inner ends of which meet at a common point and the outer ends of which respectively open through faces of said body member disposed at angles to each other, means at the outer end of each bore for forming a detachable sealed connection with a second coupling, said means being formed in part by a continuous strip passing around said body member and having openings therein for receiving said second coupling, and a valve positioned at said common meeting point for controlling the flow of fluid through said bores, said valve comprising means for connecting two of said bores together as and for the purpose described.

2. A coupling comprising a body member having two bores formed therein, the outer ends of which are open, means at the outer end of one bore for making a quick detachable sealed detachable connection with a second coupling, comprising a continuous strip passing around said body member, and means for establishing communication between said bores.

In witness whereof, I hereunto subscribe my name this 27th day of January, 1921.

DOUGLAS F. FESLER.

Witnesses:
EDNA V. GUSTAFSON,
E. J. BOURGEOIS.